(12) United States Patent
Rajagopal et al.

(10) Patent No.: US 7,869,529 B2
(45) Date of Patent: Jan. 11, 2011

(54) SYSTEM, METHOD AND COMPUTER-READABLE MEDIUM FOR DETECTION AND AVOIDANCE (DAA) OF VICTIM SERVICES IN ULTRA-WIDEBAND SYSTEMS (UWB)

(75) Inventors: Sridhar Rajagopal, Plano, TX (US); Brian C. Joseph, McKinney, TX (US); Syed N. Ahmed, Allen, TX (US); Yaming Zhang, Plano, TX (US); Sidney B. Schrum, Jr., Fairview, TX (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 11/762,659

(22) Filed: Jun. 13, 2007

(65) Prior Publication Data

US 2007/0291636 A1     Dec. 20, 2007

Related U.S. Application Data

(60) Provisional application No. 60/804,794, filed on Jun. 14, 2006.

(51) Int. Cl.
*H04K 1/10* (2006.01)
(52) U.S. Cl. ...................................... 375/260
(58) Field of Classification Search .................. 375/260
See application file for complete search history.

(56) References Cited

U.S. PATENT DOCUMENTS

| 6,983,030 B2 | 1/2006 | Storm et al. |
| 7,221,911 B2 | 5/2007 | Knobel et al. |
| 7,313,190 B2 | 12/2007 | Balakrishnan et al. |
| 2003/0231715 A1 | 12/2003 | Shoemake et al. |

(Continued)

FOREIGN PATENT DOCUMENTS

EP     1560345     8/2005

OTHER PUBLICATIONS

Lansford, "UWB coexistence and cognitive radio," International Workshop on Ultra Wideband Systems, 2004, Joint with Conference on Ultrawideband Systems and Technologies Joint UWBST & IWUWBS, Publication Date May 18-21, 2004 on pp. 35-39.*

(Continued)

*Primary Examiner*—Juan A Torres
(74) *Attorney, Agent, or Firm*—Dang M. Vo

(57) ABSTRACT

A system for detection and avoidance of victim services in ultra-wideband (UWB) systems is provided. A detect and avoid module may calculate power averages of Orthogonal Frequency Division Multiplexing tones. The power of tones may be measured and compared with power averages of corresponding tones. If a measured tone power exceeds an average power of a corresponding tone by a dynamic threshold, the tone may be identified as associated with an interferer. The threshold may be inversely related to the gain level of an automatic gain control module. The UWB subsystem may be configured with known bands of victim services of other radio frequency systems, and a tone identified as associated with an interferer that is within a known victim service band may be identified as a victim service. The UWB subsystem may attenuate or otherwise suppress transmission within the victim service band to avoid interfering with the victim service.

43 Claims, 11 Drawing Sheets

U.S. PATENT DOCUMENTS

| | | | |
|---|---|---|---|
| 2004/0001563 | A1 | 1/2004 | Scarpa |
| 2004/0008617 | A1* | 1/2004 | Dabak et al. ............... 370/208 |
| 2004/0077306 | A1 | 4/2004 | Shor et al. |
| 2004/0141548 | A1 | 7/2004 | Shattil |
| 2004/0151109 | A1* | 8/2004 | Batra et al. ............... 370/208 |
| 2005/0013387 | A1 | 1/2005 | Ojard |
| 2005/0018750 | A1 | 1/2005 | Foerster et al. |
| 2005/0047444 | A1 | 3/2005 | Park et al. |
| 2005/0135229 | A1 | 6/2005 | Molisch et al. |
| 2005/0143011 | A1* | 6/2005 | Jacobsen ............... 455/67.13 |
| 2005/0163042 | A1* | 7/2005 | Roberts ............... 370/208 |
| 2005/0164642 | A1* | 7/2005 | Roberts ............... 455/67.13 |
| 2005/0190817 | A1 | 9/2005 | Batra et al. |
| 2005/0201287 | A1 | 9/2005 | Welborn |
| 2005/0232137 | A1 | 10/2005 | Hosur et al. |
| 2005/0265221 | A1 | 12/2005 | Batra et al. |
| 2005/0276353 | A1 | 12/2005 | Bobier et al. |
| 2006/0008035 | A1 | 1/2006 | Larsson |
| 2006/0039346 | A1 | 2/2006 | Shapiro |
| 2006/0133451 | A1 | 6/2006 | Birru et al. |
| 2006/0171445 | A1 | 8/2006 | Batra et al. |
| 2006/0211377 | A1 | 9/2006 | Shoemake et al. |
| 2008/0003954 | A1 | 1/2008 | Matsuno |
| 2008/0069255 | A1 | 3/2008 | Balakrishnan et al. |

OTHER PUBLICATIONS

Chiang, "Use of Cognitive Radio Techniques for OFDM Ultrawideband Coexistence with WiMax", Texas Wireless Symposium Nov. 2005.*

Shelby, "Modified Adjacent Frequency Coding for Increased Notch Depth in MB-OFDM under DAA/Spectral Sculpting," 1st International Conference on Cognitive Radio Oriented Wireless Networks and Communications, 2006, Publication Date : Jun. 8-10, 2006 on pp. 1-5.*

Schmidt, "Reducing the peak to average power ratio of multicarrier signals by adaptive subcarrier selection," IEEE 1998 International Conference on Universal Personal Communications, 1998, ICUPC '98, Publication Date : Oct. 5-9, 1998 vol. 2 on pp. 93 -937 vol. 2 Location Florence, Meeting Date: Oct. 2-9, 1998.*

Shetty S. et al., "Detect and Avoid (DAA) Techniques—Enabler for Worldwide Ultrawideband Regulations," Institution of Engineering and Technology Seminar on Ultra Wideband Systems, Technologies and Applications, Apr. 20, 2006, pp. 21-29.

International Search Report—PCT/US07/071224, International Search Authority—European Patent Office, Dec. 22, 2008.

Written Opinion—PCT/US07/071224, International Search Authority—European Patent Office, Dec. 22, 2008.

International Preliminary Report on Patentability—PCT/US07/071224, The International Bureau of WIPO—Geneva, Switzerland, Jan. 13, 2009.

Joseph, Brian C. et al., U.S. Appl. No. 12/014,035, filed Jan. 14, 2008 for "Detection of Interferers Using Divergence of Signal Quality Estimates".

Weinstein, S. B. et al., "Data Transmission by Frequency-Division Multiplexing Using the Discrete Fourier Transform", IEEE Transactions on Communication Technology, vol. COM-19, No. 5, Oct. 1971, pp. 628-634.

Office Action mailed Aug. 19, 2008 in U.S. Appl. No. 11/226,654, filed Sep. 14, 2005.

Viterbi, Andrew J., "Error Bounds for Convolutional Codes and an Asymptotically Optimum Decoding Algorithm", IEEE Transactions on Information Theory, vol. IT-13, No. 2, Apr. 1967, pp. 260-269.

* cited by examiner

SYSTEM, METHOD AND COMPUTER-READABLE MEDIUM FOR DETECTION AND AVOIDANCE (DAA) OF VICTIM SERVICES IN ULTRA-WIDEBAND SYSTEMS (UWB)

RELATED APPLICATION DATA

This patent application claims the benefit of provisional U.S. Patent Application Ser. No. 60/804,794, filed Jun. 14, 2006, which is hereby incorporated by reference.

BACKGROUND

Orthogonal Frequency Division Multiplexing (OFDM) is a form of wireless multi-carrier modulation wherein carrier spacing is selected so that each subcarrier is orthogonal to the other subcarriers. This orthogonality avoids adjacent channel interference and prevents the demodulators from seeing frequencies other than their own. The benefits of OFDM are high spectral efficiency, resiliency to Radio Frequency (RF) interference, and lower multi-path distortion.

In OFDM the subcarrier pulse used for transmission is chosen to be rectangular. This has the advantage that the task of pulse forming and modulation can be performed by a simple Inverse Discrete Fourier Transform (IDFT) which can be implemented very efficiently as an Inverse Fast Fourier Transform (IFFT). Therefore, the receiver only needs a FFT to reverse this operation.

Incoming serial data is first converted from serial to parallel and grouped into x bits each to form a complex number. The number x determines the signal constellation of the corresponding subcarrier, such as 16 Quadrature Amplitude Modulation. The complex number are modulated in a base-band fashion by the IFFT and converted back to serial data for transmission. A guard symbol is inserted between symbols to avoid inter-symbol interference (ISI) caused by multi-path distortion. The discrete symbols are converted to analog and low-pass filtered for RF up-conversion. The receiver then simply performs the inverse process of the transmitter.

The seminal article on OFDM is "Data Transmission by Frequency-Division Multiplexing Using the Discrete Fourier Transform", by S. B. Weinstein and Paul M. Ebert in *IEEE Transactions on Communication Technology*, Vol. com-19, No. 5, October 1971.

OFDM forms the basis for the Digital Audio Broadcasting (DAB) standard in the European market as well as the basis for the global Asymmetric Digital Subscriber Line (ADSL) standard. Development is ongoing for wireless point-to-point and point-to-multipoint configurations for Wireless Local Area Networks using OFDM technology. In a supplement to the IEEE 802.11 standard, the IEEE 802.11 working group published IEEE 802.11a, which outlines the use of OFDM in the 5.8-GHz band.

In a packet communication system, data that is communicated is first grouped into packets of data, and the data packets, once formed, are then communicated, sometimes at discrete intervals. Once delivered to a receiving station, the information content of the data is ascertained by concatenating the information parts of the packets together. Packet communication systems generally make efficient use of communication channels as the communication channels need only to be allocated pursuant to a particular communication session only for the period during which the data packets are communicated. Packet communication channels are sometimes, therefore, shared communication channels that are shared by separate sets of communication stations between which separate communication services are concurrently effectuated.

A structured data format is set forth in the present promulgation of the operating specification. The data format of a data packet formed in conformity with standards, such as the WiMedia or ECMA-368/369, includes a preamble part and a payload part. Other packet communication systems analogously format data into packets that also include a preamble part and a payload part. The payload part of the packet contains the information that is to be communicated. That is to say, the payload part is non-determinative. Conversely, the preamble part of the data packet does not contain the informational content that is to be communicated but, rather, includes determinative data that is used for other purposes. In particular, the preamble part of an WiMedia or ECMA-368/369 packet preamble includes three parts, a packet sync sequence, a frame sync sequence, and a channel estimation sequence. The packet sync sequence is of a length of twenty-one OFDM (symbols), the frame sync sequence is of a length of three OFDM symbols, and the channel estimation sequence is of a length of six OFDM symbols. Collectively, the sequences are of a time length of 9,375 microseconds.

Of particular significance, the preamble also is used for channel estimation. The radio channel upon which the packet is communicated undergoes reflections and is otherwise distorted during its communication to the receiving station. To receive the transmitted data correctly, the receiving station must be provided with a good estimate of the channel to permit proper compensation to be made of the channel. The channel estimation sequence is a known waveform that tells the receiver what the channel looks like. From this known waveform, the receiver can properly compensate the channel to help decode the unknown data sequences.

Ultra-wideband (UWB) includes technology having a bandwidth larger than 500 MHz or 25 percent of a center frequency. Contemporary interest exists in development of wireless versions of serial technologies, such as universal serial bus (USB), capable of UWB transmission rates due to the proliferation of USB-adapted devices in various computational and media systems.

UWB systems spread transmit energy across a wide bandwidth, some of which is occupied by other licensed users. To abide by the rules of government regulatory bodies such as the Federal Communications Commission (FCC), UWB systems may require a method for automatic detection of these other users ("victim services") of the band and then avoid transmitting over those users. This concept is commonly referred to as Detect and Avoid (DAA). As referred to herein, a victim service comprises transmissions of a device in a licensed band. The licensed band may be shared among non-licensed systems, such as UWB systems. Accordingly, the victim service may require preferential transmission rights when the device operating on the licensed spectrum contends with devices operating, at least in part, on the same spectrum in an unlicensed usage. More generally, a victim service may refer to any transmission of a device having a preferential spectrum usage right with respect to another device.

DAA utilizes an algorithm that is dependent on the time and frequency domain characteristics, power levels and bandwidths of the victim service, making it a difficult problem to solve. The presence of noise and multipath reflections and radio impairments such as DC offsets only increase the complexity of the problem. In addition, the regulations in different countries may require different criteria for DAA of victim services.

Unintended radiation (known as spurs) can also trigger these mechanisms and cause unnecessary avoidance and denial-of-service. In such cases, it is difficult to distinguish an interferer from a spur.

Narrowband systems such as Bluetooth® have provided interference mitigation by using frequency hopping as a means of robustness to avoid interference from IEEE 802.11b systems that share the same unlicensed band. However, ultra-wideband systems occupy bandwidth involving several GHz and hence can interfere with multiple licensed services.

For OFDM-based UWB systems, state of the art techniques have proposed the use of the Fourier Fast Transform in order to detect the interferers if the interferer is seen above a certain detection threshold in the frequency domain. However, several issues complicate the detection process such as the time-varying nature of the victim service, the bandwidth, the effect of the victim service at null tones such as the DC tone or at band edges, the power level and spurs.

Therefore, it would be desirable to have a Detect and Avoid method that can handle the complexity of ultra-wideband interference and improve filtering of spurs that might trigger false alarm rejections.

SUMMARY OF THE INVENTION

In accordance with embodiments disclosed herein, a DAA module may calculate power averages across OFDM tones to facilitate detection of interferers. The power of individual tones may then be measured and compared with power averages across tones. If a measured tone power exceeds an average power across tones by a dynamic threshold, the tone may be identified as associated with an interferer. In an embodiment, the threshold may be inversely related to the gain level of an automatic gain control module. A UWB subsystem (or alternatively the host thereof) may be configured with known bands of victim services of other RF systems. Also, if a tone is identified as associated with an interferer and is within a known victim service band, the interferer may be identified as a victim service. In this event, the UWB subsystem may attenuate or otherwise suppress transmission within the victim service band to avoid interfering with the victim service. In another embodiment, the UWB subsystem may be configured with an indication of OFDM tones known to exhibit spurs. In an embodiment, tones known to exhibit spurs may be excluded from tone power averaging calculations and interferer detection routines. In still other embodiments, the UWB subsystem may be configured with known victim service bands based on geographic regions, and identification of a victim service may be based on correlating the detected interferer information with the known victim service bands in a geographic region. Various other embodiments including mechanisms for providing an adjustable threshold for spur mitigation, interrupt mechanisms, MAC filtering based on a geographic location, propagating interference information within a UWB system for systems featuring co-located radios, signaling channel selection mechanisms, invoking low power/sleep modes upon identification of a victim service interferer, mechanisms for performing power measurements during natural or artificial silence periods, and coordinated silence superframe band hopping mechanisms are provided by the present disclosure.

BRIEF DESCRIPTION OF THE DRAWINGS

Aspects of the present disclosure are best understood from the following detailed description when read with the accompanying figures, in which.

DETAILED DESCRIPTION

Figure 1:
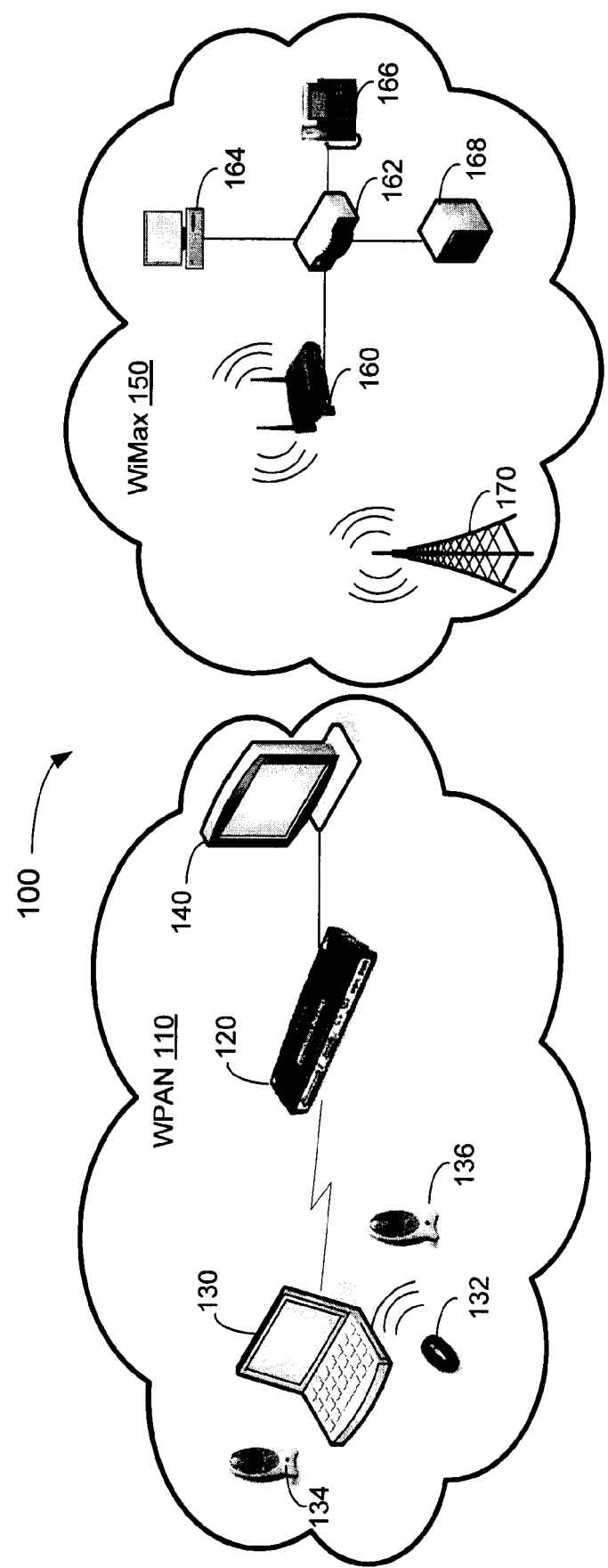
FIG. 1 is a diagrammatic representation of an ultra-wide-band system in which embodiments disclosed herein may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Embodiments disclosed herein provide a method and system for detecting and avoiding interfering transmissions during ultra-wideband wireless communication. The method includes measuring the power of a frequency sub-carrier and calculating sub-carrier average power. If a spike in power of a tone exceeds an average power for that tone that is in excess of a threshold, an interfering signal may be declared. Transmission on the sub-carrier as long as the interfering signal is present may be prohibited.

FIG. 1 is a diagrammatic representation of a network system 100 in which embodiments disclosed herein may be implemented. Network system 100 may comprise a wireless personal area network (WPAN) 110 implemented as a ultra-wideband (UWB) system. In the illustrative example, WPAN 110 includes a wireless docking station (120) that facilitates communication of various peripheral wireless devices, e.g., a wireless mouse 132 and speakers 134-136, with a wireless laptop 130. One or more devices, such as a display device 140, may be physically coupled with wireless router 120. WPAN 110 provides for communications among the various WPAN devices and may additionally interface with higher level networks, e.g., the Internet. Typical ranges of WPAN are very limited, such as a few meters. One or more devices within WPAN 110 may wirelessly transmit OFDM modulated data. Devices in WPAN 110 may include a OFDM subsystem adapted for OFDM modulation for transmission within WPAN 110. In an embodiment, the OFDM subsystem may be included in a ultra-wideband system that effects communications over an unlicensed radio spectrum.

System 100 may additionally include any number of other network systems, such as a WiMax system 150. WiMax system 150 provides for wireless data transmissions over relatively large distances. In the illustrative example, WiMax system 150 includes a wireless radio 160 that may interface with a router 162 or other layer 3 switch. Various devices may interconnect with router 162, such as a computer system 164, an Internet Protocol (IP) telephony device 166, and an IP private branch exchange (PBX) 168. Wireless radio 160 may communicate with a WiMax hub site 170 over an air interface. Hub site 170 may connect with an IP core network (not shown), e.g., via an aggregation switch, router, or other suitable infrastructure.

WiMax system 150 may operate in a licensed band that overlaps with usable spectrum of WPAN 110. Thus, WiMax system 150 may at times be in contention with radio resources of WPAN 110, and WPAN 110 and WiMax system 150 may mutually interfere with one another In instances where WiMax 150 and WPAN 110 attempt access to a shared radio interface, WiMax system 150 may be referred to as a victim service. In accordance with embodiments disclosed herein, WPAN 110 is provided with mechanisms that facilitate detection and avoidance of a victim service interferer.

Figure 2:
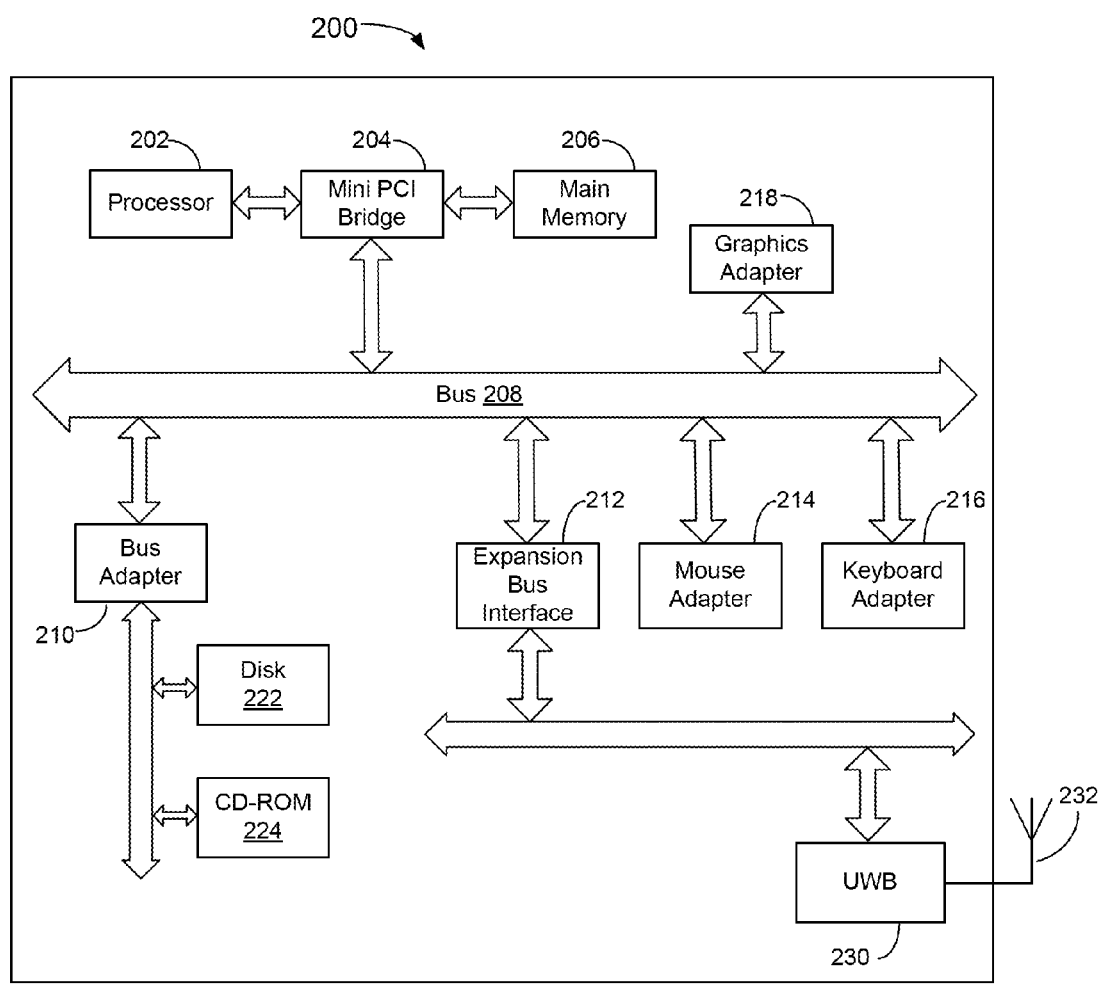
FIG. 2 is a diagrammatic representation an exemplary data processing system in which embodiments disclosed herein may be implemented.

FIG. 2 is a diagrammatic representation an exemplary data processing system 200, such as wireless laptop 130 depicted in FIG. 1, in which embodiments disclosed herein may be implemented.

Code or instructions implementing processes of embodiments disclosed herein may be located or accessed by system 200. In the illustrative example, system 200 employs a mini PCI bus architecture, although other bus architectures may be used. A processor system 202 and a main memory 206 are connected to a local bus 208 through a bridge 204. Bridge 204 also may include an integrated memory controller and cache memory for a processor 202. Additional connections to local bus 208 may be made through direct component interconnection or through add-in connectors. In the depicted example, a small computer system interface (SCSI) host bus adapter 210, an expansion bus interface 212, a mouse adapter 214, a keyboard adapter 216, and a graphics adapter 218 are connected to local bus 208 by direct component connection. In contrast, a UWB subsystem 230 may be connected to local bus 208 via expansion bus interface 212 by add-in boards inserted into expansion slots. Alternatively, UWB subsystem 230 may directly connect with bus 208. In the preset example, UWB subsystem 230 provides an interface for connecting system 200 with other devices, e.g., a wireless hub or router, a wireless docking station, or the like, via radio antenna 232. SCSI host bus adapter 210 provides a connection for a hard disk drive 222, and a CD-ROM drive 224. Typical mini PCI local bus implementations may support a plurality of PCI expansion slots or add-in connectors.

An operating system runs on processor 202 and is used to coordinate and provide control of various components within system 200. Instructions for the operating system and applications or programs are located on storage devices, such as hard disk drive 222, and may be loaded into main memory 206 for execution by processor 202.

In accordance with embodiments disclosed herein, UWB subsystem 230 may be deployed in system 200 and facilitates detection and avoidance of victim services in other systems. In the event the a victim service is detected, UWB subsystem 230 may suppress transmissions on one or more subcarriers associated with the detected victim service as described more fully hereinbelow.

Figure 3:
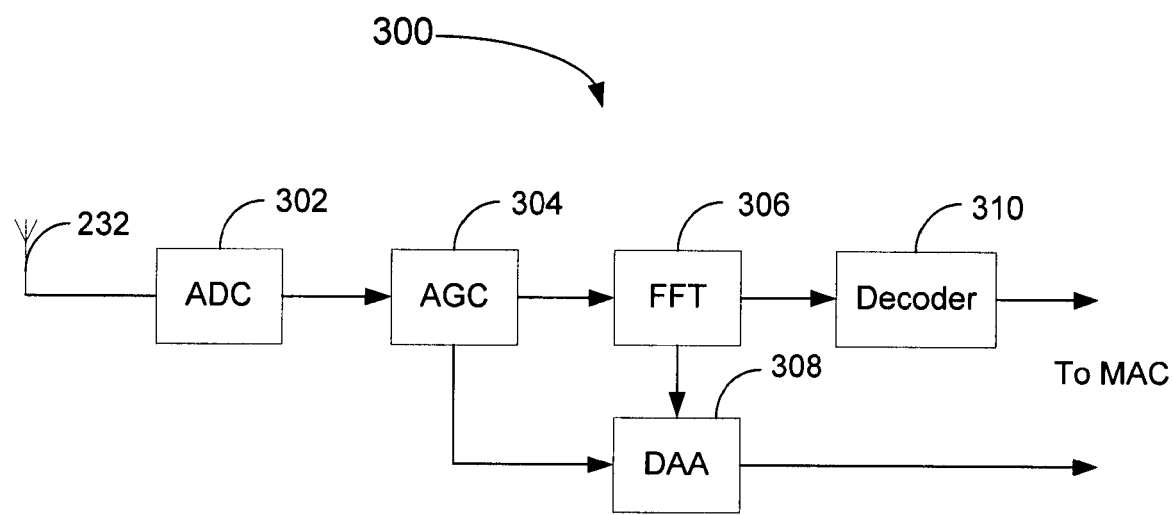
FIG. 3 is a diagrammatic representation of an OFDM receiver subsystem that may be implemented in a data processing system in accordance with an embodiment.

FIG. 3 is a diagrammatic representation of an OFDM receiver subsystem 300 that may be implemented in data processing system 200 in accordance with an embodiment. For example, subsystem 300 may be implemented in UWB subsystem 230.

In the present example, receiver subsystem comprises antenna 232 that is coupled with an analog-to-digital conversion (ADC) module 302 that samples and digitizes a received signal. The digitized signal may then be conveyed to an automatic gain control (AGC) module 304 that may amplify or attenuate the digitized signal. Output of AGC module 304 may be supplied to a Fast Fourier Transform (FFT) module 306 that converts the signal to the frequency domain and to a detect and avoid (DAA) module 308. Additionally, parallel streams output by FFT module 306 are supplied to a decoder 310 that outputs a serial stream therefrom that may be supplied to a MAC layer along with output from DAA module 308. Various other components or functions, such as quadrature mixers and low-pass filters, may be included in subsystem 300, and the depiction of subsystem 300 is simplified to facilitate an understanding of disclosed embodiments.

In accordance with embodiments disclosed herein, DAA module 308 may calculate power averages of OFDM tones to facilitate detection of interferers. The power of individual tones may then be measured and compared with power averages across tones. If the measured tone power exceeds an average power across tones by a dynamic threshold, the tone may be identified as associated with an interferer. In an embodiment, the threshold may be inversely related to the gain level of AGC 304. UWB subsystem 230 (or alternatively the host thereof) may be configured with known bands of victim services of other RF systems. Also, if a tone is identified as associated with an interferer and is within a known victim service band, the interferer may be identified as a victim service. In this event, the UWB subsystem may attenuate or otherwise suppress transmission within the victim service band to avoid interfering with the victim service. In another embodiment, UWB subsystem 230 may be configured with an indication of OFDM tones known to exhibit spurs. In an embodiment, tones known to exhibit spurs may be excluded from tone power averaging calculations and interferer detection routines. Various other embodiments including mechanisms for providing an adjustable threshold for spur mitigation, interrupt mechanisms, MAC filtering based on a geographic location, propagating interference information within a UWB system for systems featuring co-located radios, signaling channel selection mechanisms, invoking low power/sleep modes upon identification of a victim service interferer, mechanisms for performing power measurements during natural or artificial silence periods, and coordinated silence superframe band hopping mechanisms are provided by embodiments of the present disclosure. These, and various other embodiments, will be readily apparent as disclosed more fully hereinbelow.

Figure 4:
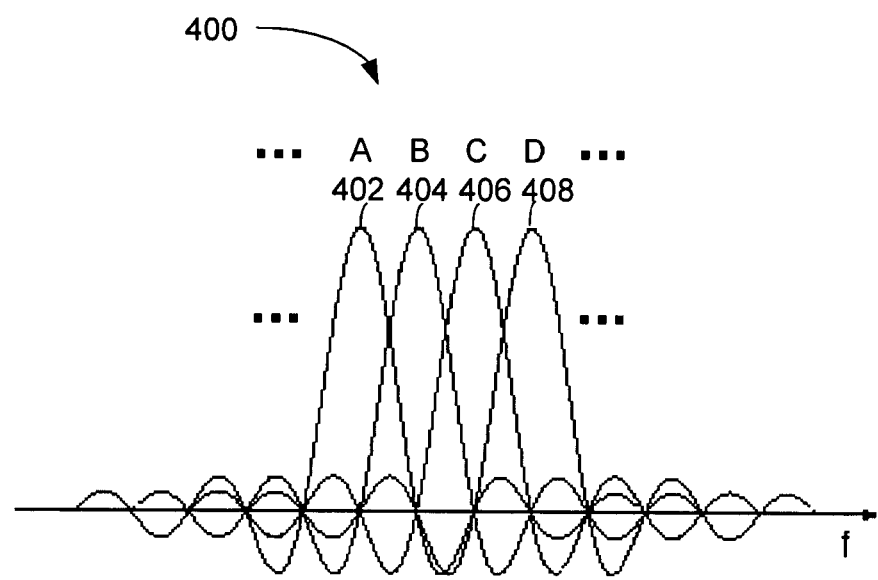
FIG. 4 is a diagrammatic representation of an OFDM signal that may be used as a carrier in the system depicted in FIG. 1 in accordance with an embodiment.

FIG. 4 is a diagrammatic representation of an OFDM signal 400 that may be used as a carrier in the system depicted in FIG. 1 in accordance with an embodiment. OFDM signal 400 comprises a plurality of sub-carriers 402-408. Each sub-carrier 402-408 is modulated with a conventional modulation scheme, e.g., quadrature amplitude modulation, at respective data rates similar to single carrier modulation schemes in the same bandwidth. According to the theorems of the Fourier Transform the rectangular pulse shape will lead to a sin(x)/x type of spectrum of the subcarriers as illustrated. The spectrums of the subcarriers are not separated but overlap. The reason why the information transmitted over the carriers can be separated is the orthogonality relation. By using an IFFT for modulation, the spacing of the subcarriers is chosen such that at the frequency where a received signal is evaluated (illustratively indicated by letters A-D in FIG. 1) all other signals are zero. The diagrammatic representation of OFDM signal 400 is greatly simplified, and OFDM signal 400 may include a large number, e.g., 128, sub-carriers for application in an ultra wideband system.

In accordance with an embodiment, a detection threshold may be defined that facilitates interferer detection associated with victim services, e.g., of other system devices operating in a common or overlapping radio spectrum. Transmissions in the UWB system may then be suppressed to avoid interfering with the detected victim service.

Embodiments disclosed herein provide for an Automatic Gain Control (AGC) power level detection function to lower the detection threshold for interferer detection. Victim services that have the same total power level (dBm) received at the antenna but very small bandwidth are easier to detect than victims with larger bandwidth. This is because the total energy of a wide-band interferer is spread across a large bandwidth, making the energy/frequency (dBm/MHz) a small number and hence, this makes the detection of wider band interferers difficult.

The AGC algorithm processes data in the time domain at the receiver input before the data gets converted into the frequency domain. Therefore, the AGC sensitivity only depends on the total power (dBm) and not power per frequency bin. In case of wide band interferers, the AGC can know that this is a strong signal in the time domain, even though in the frequency domain the interference looks smaller due to the larger bandwidth used by the interferer. Therefore, the AGC estimate of the received energy can be used to lower the detection threshold for wideband interference and thereby facilitate detection. This may be accomplished by setting the detection threshold to be inversely proportional to AGC power level.

Figure 5:
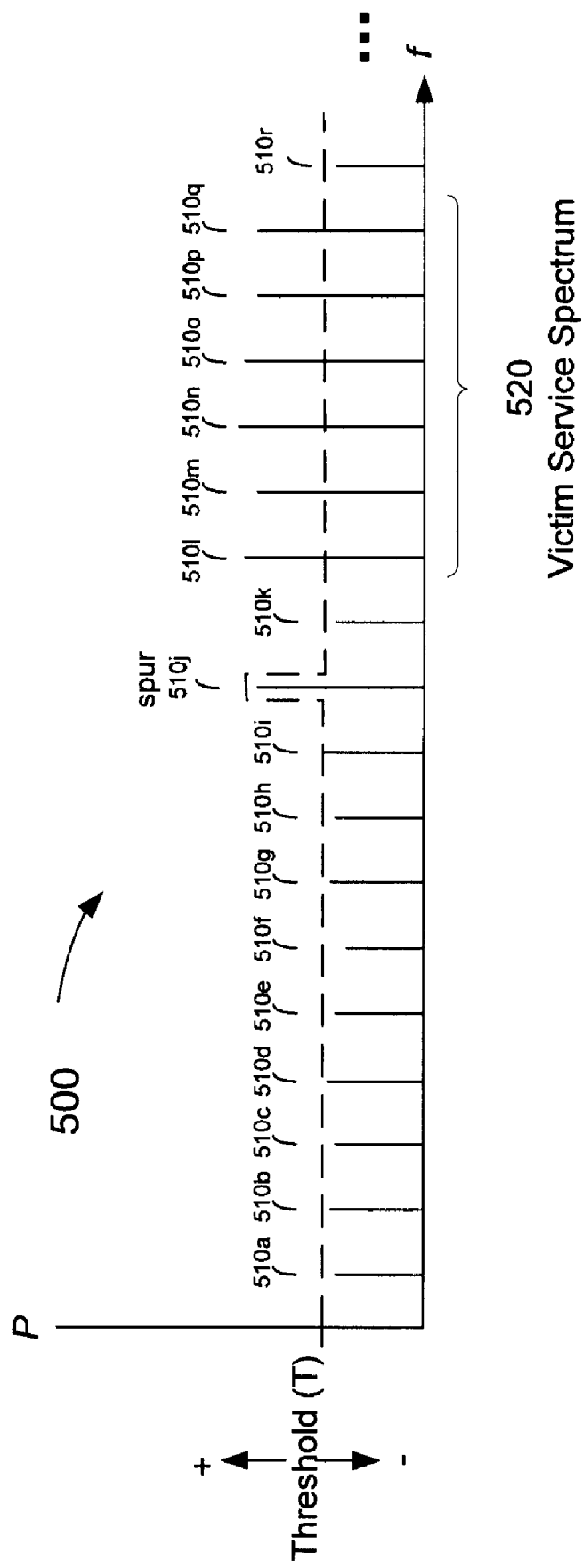
FIG. 5 is a diagrammatic representation of a tone sequence that may be evaluated for an interferer in accordance with an embodiment.

FIG. 5 is a diagrammatic representation of a tone sequence 500 that may be evaluated for an interferer in accordance with an embodiment. In the present example, tone sequence 500 comprises tones 510a-510r that each generally corresponding to an OFDM sub-carrier. Interferer detection may be made on a per tone basis by obtaining power measurements at respective tones 510a-510r. An average power may be measured across tones 510a-510r, and threshold T (illustratively designated with dashed lines) may be derived from the average power. The power average may be calculated across multiple OFDM signals, and the threshold T may be adjusted according to changes in the average power measurement. Power measurements of tones may then be compared with the threshold, and tones having a power measured in excess of the threshold may be identified as an interferer. In accordance with an embodiment, the threshold, T, may be dynamically adjusted inversely with the AGC gain level. Accordingly, detection of wideband interference is advantageously facilitated. Tones, such as tone 510j, that are known to exhibit a spur may be excluded from power average measurements. The threshold may be adjusted to accommodate a spur such that interferers on top of a spur may be detected as described more fully hereinbelow. In accordance with another embodiment, the UWB system may be configured with a spectrum 520 known to be used by a victim service in a band that may also be used by the UWB system.

Figure 6:
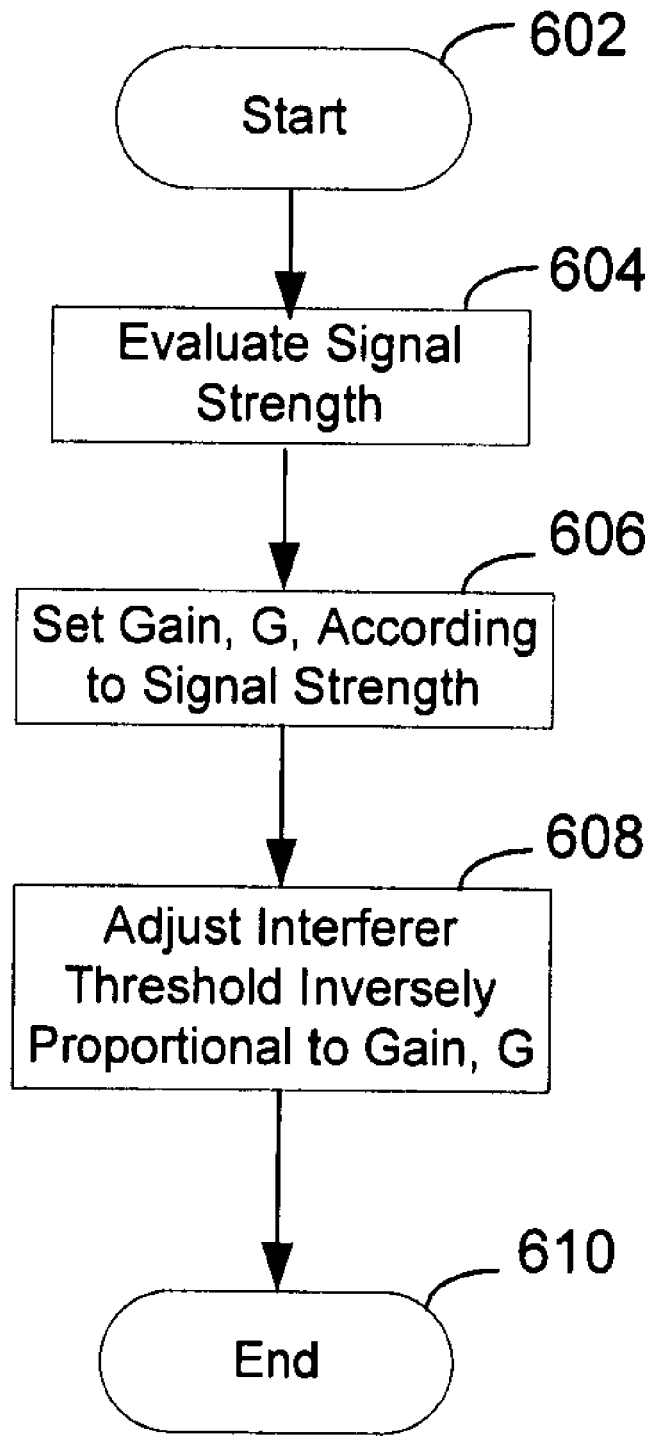
FIG. 6 is a flowchart depicting processing of an AGC routine implemented in accordance with an embodiment.

FIG. 6 is a flowchart depicting processing of an AGC routine implemented in accordance with an embodiment. The AGC routine is invoked (step 602), and an evaluation of the signal strength is made (step 604). The gain level, G, may then be set according to the measured signal strength (step 606). An interferer threshold, T, may then be adjusted inversely proportional to the gain level (step 608) such that increases in the gain level result in decreases in the threshold, and decreases in the gain level result in increases in the threshold. The AGC routine cycle may then complete according to step 610.

In accordance with embodiment, variable averaging in the Physical Layer (PHY) and the Media Access Control (MAC) layer for interference detection is provided. It is possible to have false detections due to noise and multipath variations. The use of averaging can help mitigate false interferer detections. However, it may not be possible to average over a long period as the victim service may go away in that time-period. The use of variable averaging in the PHY and in the MAC can help make devices flexible enough to adapt to different time-varying characteristics of the victim service and false alarm rejection rates.

The PHY averaging may be performed over relatively short time intervals in hardware, and the MAC averaging may be performed over longer intervals typically by software. The interferer may not be continuous in time and may be "bursty." The PHY averaging is used to optimize the averaging within a burst (on a smaller time scale), while the MAC averaging can be used to average over multiple bursts of interference. The amount of averaging needed would be tied to the requirements for reliable interference detection, false alarm requirements and the time and frequency domain behavior of the interference.

Often, it can be known in advance where there might be spurious emissions (spurs) in the device. This can be done by "sniffing" the device to see the frequencies being leaked in the device and the amplitude of the spurious emission. A mask may be used to exclude the tones containing spurs from interference detection since these tones could bias the detection algorithm. The mask can be implemented, for example, by a programmable bit-pattern per sub-carrier that indicates the locations of these spurs. Each bit in the mask represents the location of the spur at that frequency bin.

Figure 7:
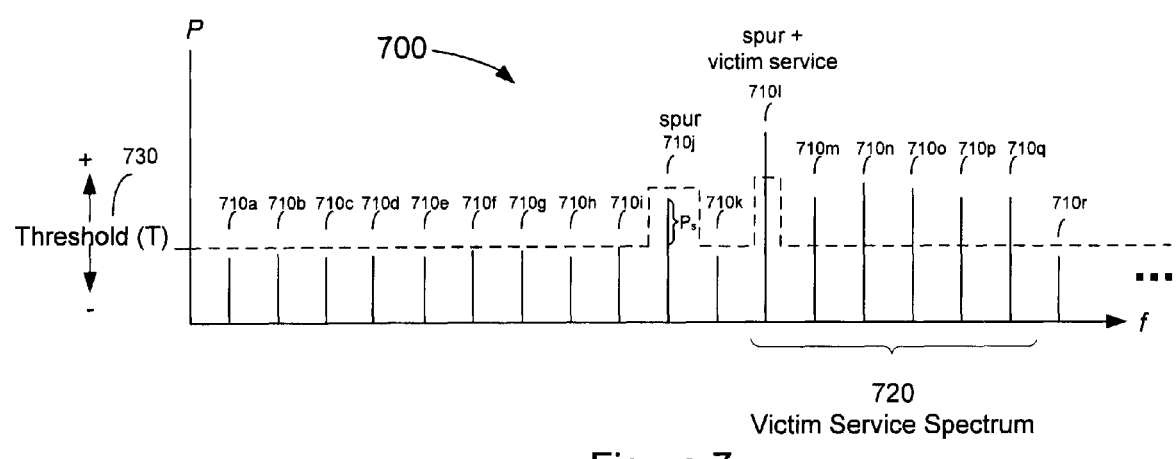
FIG. 7 is a diagrammatic representation of an OFDM signal including a sub-carrier that exhibits a spur that may be masked to facilitate interferer detection in accordance with an embodiment.

FIG. 7 is a diagrammatic representation of an OFDM signal 700 including a sub-carrier that exhibits a spur that may be masked to facilitate interferer detection in accordance with an embodiment. OFDM signal 700 comprises a plurality of tones 710a-710r. OFDM signal 700 is representative of an OFDM signal generated for transmission in a UWB device, such as a UWB subsystem of computer system 130 depicted in FIG. 1. In the illustrative example, tone 710j exhibits a spur having an approximate amplitude $P_s$. Tones that exhibit spurs may be identified, e.g., by sniffers or other mechanisms during pre-production, and in accordance with an embodiment, a UWB subsystem or other entity of a system featuring a UWB subsystem may be configured with identifiers of subcarriers determined to exhibit such spurs. Accordingly, OFDM sub-carriers known to exhibit spurs may be excluded from power averaging to facilitate accurate identification of an interferer.

Figure 8:
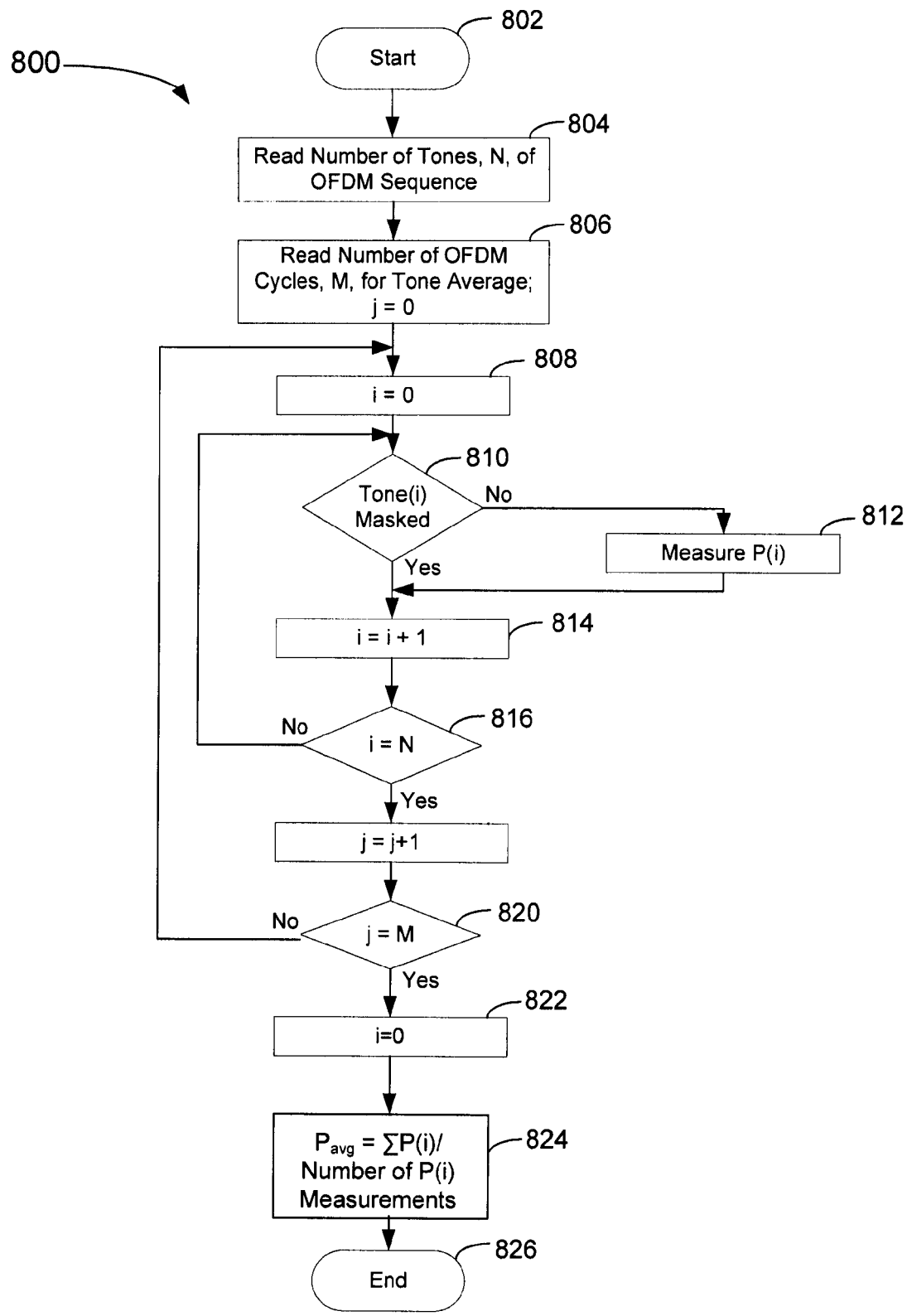
FIG. 8 is a flowchart depicting processing of a variable averaging routine that facilitates interferer detection in accordance with embodiments.

FIG. 8 is a flowchart 800 depicting processing of a variable averaging routine that facilitates interferer detection in accordance with embodiments. The averaging routine is invoked (step 802), and a number of tones, N, of an OFDM sequence for which power averages are to be calculated is read (step 804). A number of OFDM signal cycles, M, over which the tone averages are to be calculated is then read, and a counter variable, j, may be initialized (step 806). A tone index variable, i, may then be initialized (step 808).

An evaluation may then be made to determine if a first tone(i) is masked (step 810), that is if tone(i) is known to exhibit spurs. If tone(i) is not masked, the power, P(i), of tone(i) may be measured for the current OFDM signal cycle j (step 812). The averaging routine may then proceed to increment the tone variable i (step 814). In the event that tone(i) is determined to be masked at step 810, the power averaging routine may skip the current tone(i) and may proceed to increment the tone index variable, i, according to step 814. Alternatively, a default power level may be assigned to the masked tone.

After the tone index variable i is incremented, an evaluation may be made to determine if all tones of the OFDM signal have been evaluated (step 816). In the event that a tone(i) remains for the average power calculation, processing may return to step 810 to determine if tone(i) is masked. When all tones have been evaluated for the OFDM signal, an evaluation may be made to determine if tones of another OFDM signal are to be included in the current average power calculations (step 820). If tones of another OFDM signal are to be included in the current power average, that is if the counter variable j does not equal the number of OFDM signal cycles M, processing may return to step 808 to reinitialize the tone index variable i. If it is determined that no more OFDM signals are to be included in the current power averaging cycle, that is if the counter variable j is equal to the number of OFDM signal cycles M, the tone counter variable i may be reinitialized (step 822), and an average power calculation for the OFDM signal may be calculated (step 824). For example, the power measurement of each of the tones may be summed, and the sum may be divided by the total number of tone power measurements. When the average power calculation has been made, the average power calculation routine cycle may end (step 826).

The power average calculations may be made on a rolling basis. For example, on a first iteration, tones of a single OFDM signal may be used in calculating the power average. Assuming the desired number of tones, N, to be included in the power average is greater than one, a tone power measurement may be made on a subsequent OFDM signal, and the power average of the subsequent signal may be averaged with the previous OFDM signal power average. Accordingly, the power average may be updated after evaluation of the power level of tones of each most recently received OFDM signal.

Figure 9:
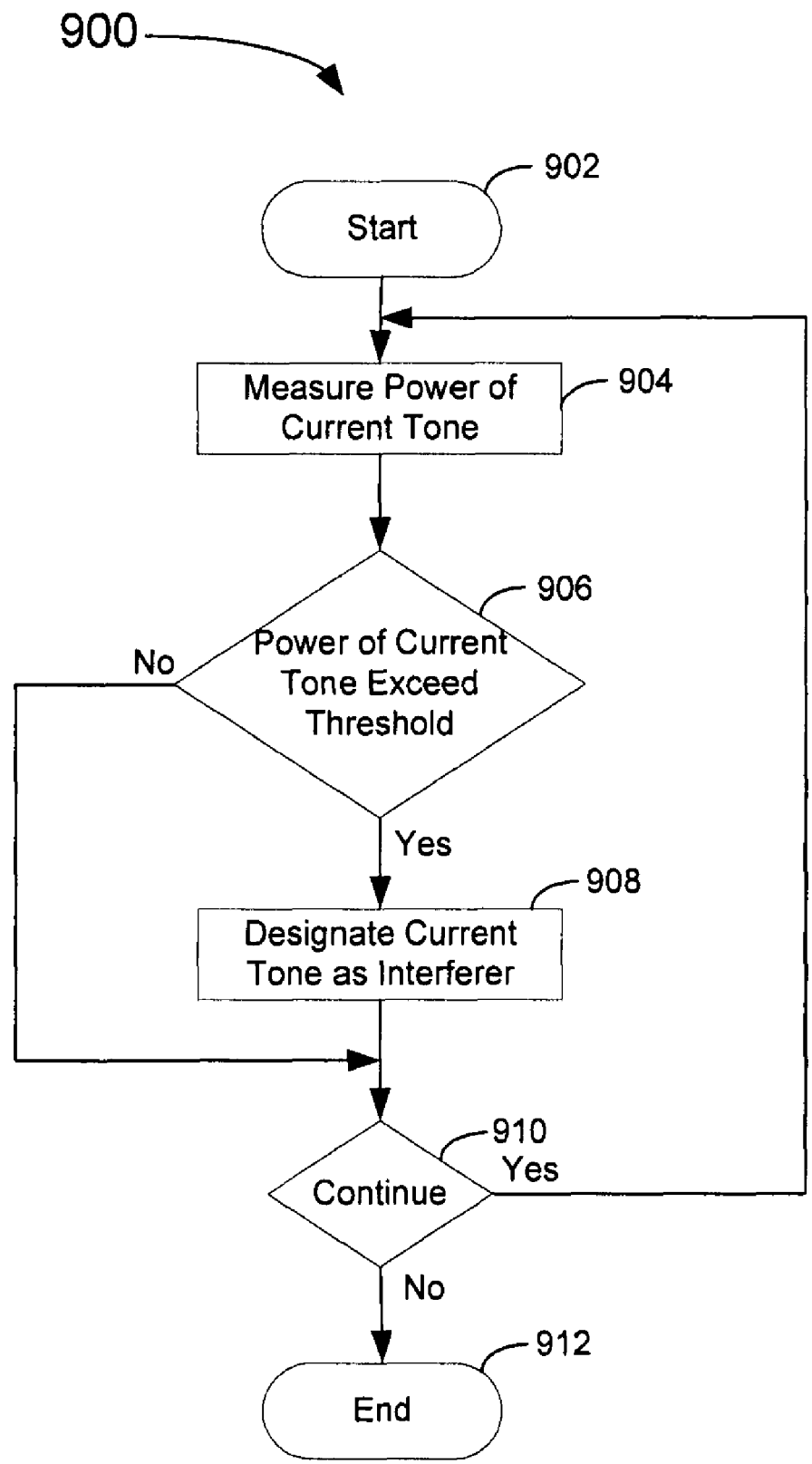
FIG. 9 is a flowchart that depicts an interferer evaluation routine implemented in accordance with an embodiment.

The power average may then be compared with tone power measurements made on a received signal. A threshold, T, may be derived as a function of the average power such that any tone power measurement that exceeds the threshold may be evaluated as an interferer. FIG. 9 is a flowchart 900 that depicts an interferer evaluation routine implemented in accordance with an embodiment. The interferer evaluation routine is invoked (step 902), and a power measurement is made on a current tone (step 904). The measured power of the current tone may then be compared with the threshold derived from the average power calculation (step 906) to determine if the measured power exceeds the threshold. If the measured power of the current tone does not exceed the threshold, the interferer evaluation routine may proceed to evaluate whether to continue (step 910). Returning again to step 906, if the measured power of the current tone exceeds the threshold, the current tone may be designated as an interferer (step 908). The interferer evaluation routine may return to step 904 to evaluate other tones of a current OFDM signal, or may alternatively exit (step 912).

Figure 10:
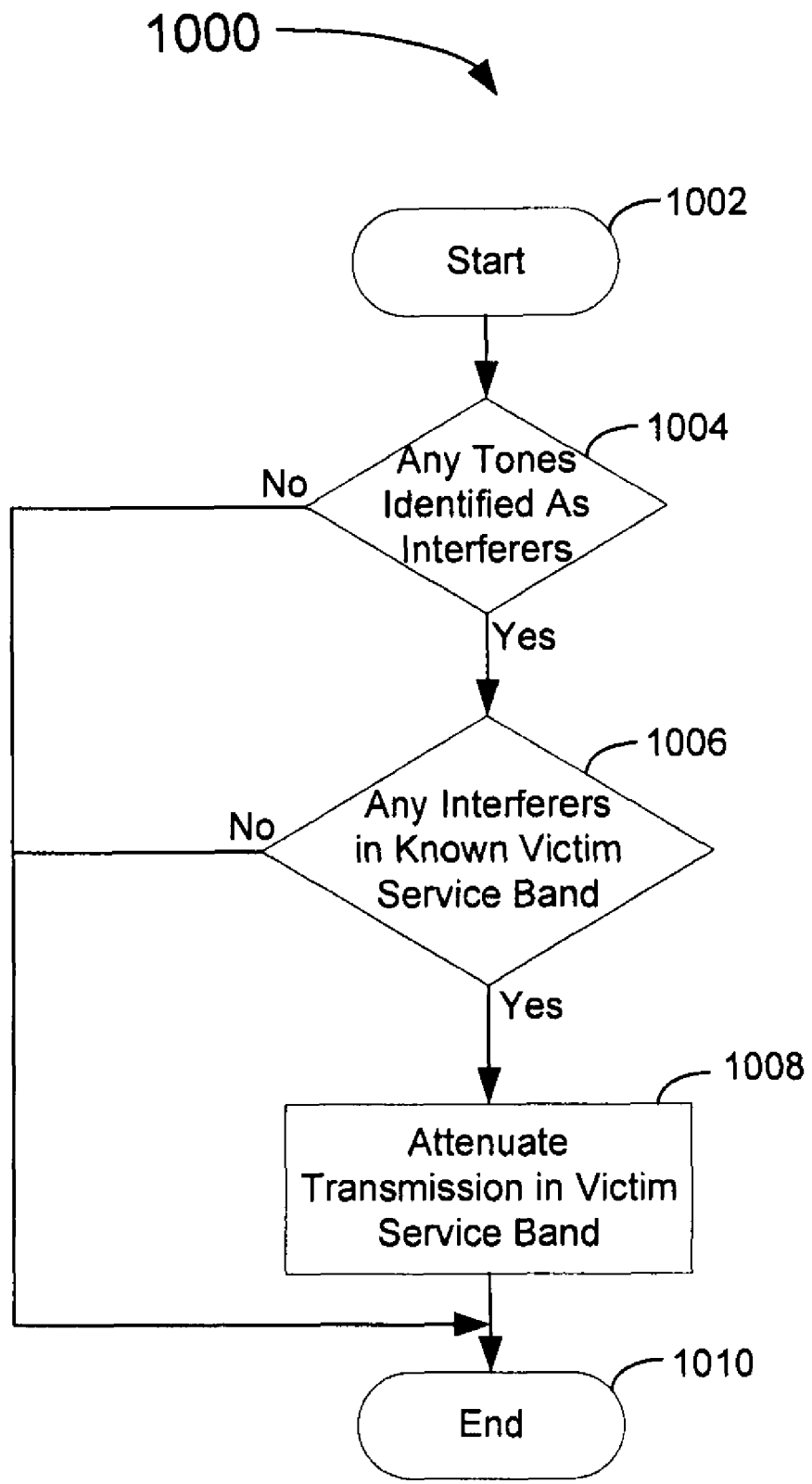
FIG. 10 is a flowchart depicting processing of a transmission suppression routine implemented in accordance with an embodiment.

FIG. 10 is a flowchart 1000 depicting processing of a transmission suppression routine implemented in accordance with an embodiment. The suppression routine is invoked (step 1002), and an evaluation may be made to determine if any evaluated tones have been identified as interferers (step 1004). If no tones have been identified as interferers, the suppression routine cycle may end (step 1010). If any tones are determined to have been identified as interferers, the suppression routine may proceed to evaluate whether any of the interferer tones are within a known victim service band of any system (step 1006). For example, referring again to FIG. 5, assume tones 510l-510q are known to be commonly shared with a victim service band 520 of a licensed spectrum shared with the UWB system. In this instance, if one or more of tones 510l-510q are evaluated as interferers thereby indicating a victim service may be being made, the suppression routine may attenuate or otherwise suppress transmissions from the UWB subsystem of the host device in the victim service band to avoid interfering with the victim service bands of the detected interferer (step 1008). The suppression routine cycle may then end according to step 1010.

In addition to using masks, an adjustable threshold factor can be introduced for spur locations so that interferers that sit on top of spurs can still be detected if they pass a threshold higher than that set by the spur. The threshold factor can be decided based on the amplitude of the spurious emission seen during sniffing. The threshold of detection is adjusted on a per-tone basis based on the spur mask and the adjustment. For example, referring again to FIG. 7, assume tone 710j is known to exhibit a spur having an approximate amplitude of $P_s$. A memory of UWB system 230 (or alternatively a memory of the host device of UWB system 230) may be configured with an indicator that tone 710j exhibits a spur and, additionally, an indicator of the spur strength or amplitude $P_s$. Accordingly, the threshold 730 (illustratively designated with dashed lines) may be adjusted by an amount substantially equal to the spur amplitude, $P_s$ for the tone known to exhibit a spur. In this manner, interferers that coincide with a tone exhibiting a spur may still be detected. For example, assume tone 710l within victim service band 720 is known to exhibit a spur. Accordingly, threshold 730 may be adjusted in proportion to the spur amplitude. In the present example, an interferer may accurately be identified on tone 710l because the threshold is adjusted higher for tone 710l with respect to other tones that do not exhibit a spur. In the illustrative example, the power measurement of tone 710l exceeds the threshold that includes an adjustment for the spur. Thus, an interferer comprising a victim service is advantageously identified at tone 710l even though tone 710l exhibits a spur. The higher the amplitude of the spur, the larger is the threshold factor used to make sure that the interferer would only be detected if its energy in that frequency bin was greater than the spur level and not the nominal detection threshold level. This can also help with interferers on tones that suffer from radio impairments that cause spikes such as the DC tone.

The use of an interrupt mechanism can be useful for the PHY-MAC interface for interference signaling so that the MAC does not have to keep polling the PHY for interferer information and can do other tasks until interrupted by the PHY. In an embodiment, the PHY may interrupt the MAC only in the case of interference detection thereby reducing the amount of continuous interaction required from the MAC.

In accordance with another embodiment, MAC filtering of victim service interference information based on geographical location awareness may be provided. Victim services occupy different frequency bands in different countries. If the MAC has information about the country it is operating in and which are the licensed users in the frequency spectrum under consideration, the MAC may decide whether an interferer is an actual victim service interferer that needs to be avoided or whether it does not matter. Once a UWB device is taken into a different country, the software setting for the country could inform the MAC of the current victim frequency bands. If the detection algorithm on the PHY informs the MAC of a certain set of frequencies that have been detected, the MAC may correlate this information with the information provided by the software to check if it needs to take any action to avoid those frequencies or whether it can ignore those frequencies. To this end, the UWB system (or alternatively the host) may be configured with indicators of various victim service bands and corresponding geographic indicators in which the victim service band may be deployed. Thus, if the UWB system, or the host thereof, is able to obtain a geographic location indication, e.g., by a global positioning system, that indicates where the UWB device is currently located, the UWB system may then obtain victim service band information applicable to the particular location in which the UWB system is operating.

In other implementations, the UWB system may be located in a relatively fixed or non-mobile device, such as a set top box. In some instances, such UWB systems may be packaged for retail in a particular country or geographic region. Accordingly, the UWB system may be configured with an indication of the UWB system's intended geographic location usage and/or applicable victim service bands associated therewith. In this implementation, the UWB system may propagate knowledge of the UWB system location and/or spectrum of victim service bands to other devices, such as mobile UWB system devices.

It has previously been considered to propagate interference information to other devices in a network. However, this information is more useful if the reliability of the interference information is known. For example, if a UWB device is co-located with a victim service radio, e.g., computer system 130 featuring both a UWB subsystem for operation in WPAN 110 as well as a WiMax subsystem for operation in WiMax system 150, the UWB device may pass that information in a MAC information element and the information about the victim service's activity can be passed as interference information, along with the fact that it came with an extreme confidence factor since the device was co-located. This information helps reduce the detection threshold at the receiver and improve the detection reliability of the network.

This information may be passed along, for example, using an information element on the MAC with some signaling information such as bits to indicate co-located radios and confidence/reliability factors. For example, a bit may be included in an information element that indicates a high reliability factor due to the fact that the UWB system is collocated with the victim service system. There are upper layer software controls which know that the victim radio is going to transmit soon and this information may be passed via software from the victim service device to the co-located UWB device. The UWB device may then transmit this information using the information element to other devices in the network with the location of the interference frequencies to avoid.

UWB devices, based on a multi-band operation mode, contain channels that do not use the band with interference. On detection of such interferers, the MAC can decide to use a channel that is interference free in accordance with an embodiment. If there are multiple free channels, the channel may be selected based on the best performance requirements for operation.

If there is a victim service that needs to be avoided, the MAC may use this information to go into a low power or sleep mode and decide to wake up after a time-out period for the interferer to have completed transmission. The time-out period can be made programmable in the MAC and may depend on regulations in different countries.

Figure 11:
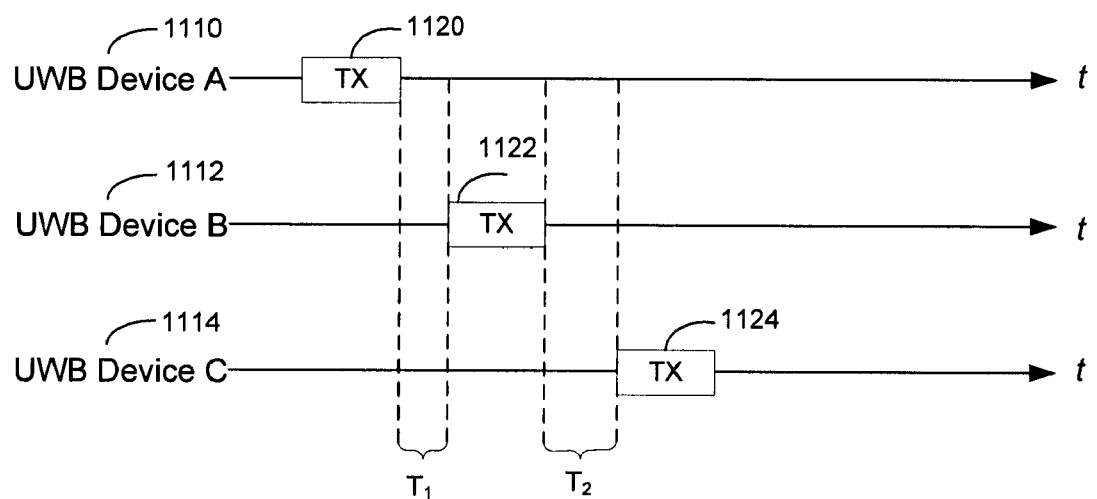
FIG. 11 depicts a diagrammatic representation of UWB device transmissions that include natural, or non-coordinated, silent periods that may be exploited for identifying interferers in accordance with an embodiment.

Detection of interferers is most reliable when there is no traffic on the network and everyone is silent enough to hear the interference. Given that a network is never 100% fully utilized, there are natural periods of silence in a network that may be utilized to clearly hear any interfering victim service. This "natural" silent period is not guaranteed and is dependent on the amount of traffic in the network. For example, FIG. 11 depicts a diagrammatic representation of UWB device transmissions that include natural, or non-coordinated, silent periods that may be exploited for identifying interferers in accordance with an embodiment. In the depicted example, UWB device 1110-1114 may make transmissions 1120-1124 in a UWB system. Natural silence periods T1 and T2 may exist between the device transmissions. Devices 1110-1114 may monitor the device transceivers while making power measurements, and upon determining that no UWB transmissions are being made may identify silent periods T1 and T2. Power measurements made during the silent periods may then be utilized for detecting interferers. In accordance with another embodiment, guaranteed or coordinated silent intervals, such as Short Inter-frame Space/Mutual Information based Feature Selector (SIFS/MIFS) intervals between packets, may similarly be exploited for detecting interferers. These spacing intervals are minimum spacing intervals between packet transmissions to mark start and end of packet transmissions. Advantageously, the UWB devices may anticipate these silent periods for detecting interferers.

In case the natural silence intervals are insufficient, artificial or controlled silent periods may be created by MAC time-slot reservations to facilitate DAA. Artificial silent periods imply reserving time slots that do not have any transmission specifically for helping DAA, explained in detail below.

UWB devices attempting to avoid interfering with non-UWB devices may attempt to discover nearby victim receivers by detecting their transmissions. Detection of victim receivers is facilitated by having all UWB devices in an area observe common coordinated periodic "silence" or "transmit inactivity" periods during which no UWB devices transmit. For example, the MAC may transmit beacons, which are used for general coordination of devices in the UWB network, and the beacons may be used to negotiate and coordinate these transmit inactivity periods. Transmit inactivity facilitates detection of victim receivers by eliminating UWB transmissions which may mask victim receiver transmissions. In addition, transmit inactivity may allow certain types of non-UWB devices to transmit which then allows UWB devices to detect these non-UWB devices. Certain types of non-UWB devices must decode transmissions from a "base station" device before transmitting, and transmit inactivity increases the probability that these types of non-UWB devices will decode transmissions from a "base station" device.

Coordinated transmit inactivity periods can be used to share frequency bands used by UWB devices with non-UWB devices. Non-UWB devices that are aware of these transmit inactivity periods may transmit during the transmit inactivity periods without experiencing interference from UWB devices and without interfering with UWB devices. The non-UWB devices may be made aware of this by being co-located with a UWB device and getting software information passed to the non-UWB device from the UWB device. Non-UWB devices may utilize their native access methods and protocols during these UWB transmit inactivity periods.

In another embodiment, a mechanism for creating shared, coordinated transmit inactivity periods among UWB devices that are mutually within range of one another is provided. This mechanism builds on the WiMedia MAC Distributed Reservation Protocol (DRP) that allows devices to reserve certain slots of time in the network for transmission for exclusive use by the device. Hence, it is the contention-free mode of transmission. The DRP mechanism resides in the MAC. The present invention defines a new DRP type called a "silent" DRP which is a shared coordinated transmit inactivity period.

When a device in a network wants to create a silent period, it first checks whether there is already one that has been established and if so, synchronizes to it. If there is none, it creates a silent period reservation and lets other devices in range know via its beacon that there is a silent period that others may use to facilitate their detection. The advantage of this "shared" DRP is that it allows multiple devices to use a single DRP slot for detection, rather than each device making its own request for a DRP slot. If this was not shared, multiple devices would be unnecessarily affecting the network throughput by reserving individual silent DRP slots that could have been better utilized for packet transmissions.

Superframe band hopping may also be employed to provide for coordinated transmit inactivity within a frequency band in accordance with an embodiment. In this implementation, non-UWB devices periodically sequence through frequency bands in order to provide coordinated transmit inactivity within a given frequency band.

Figure 12:
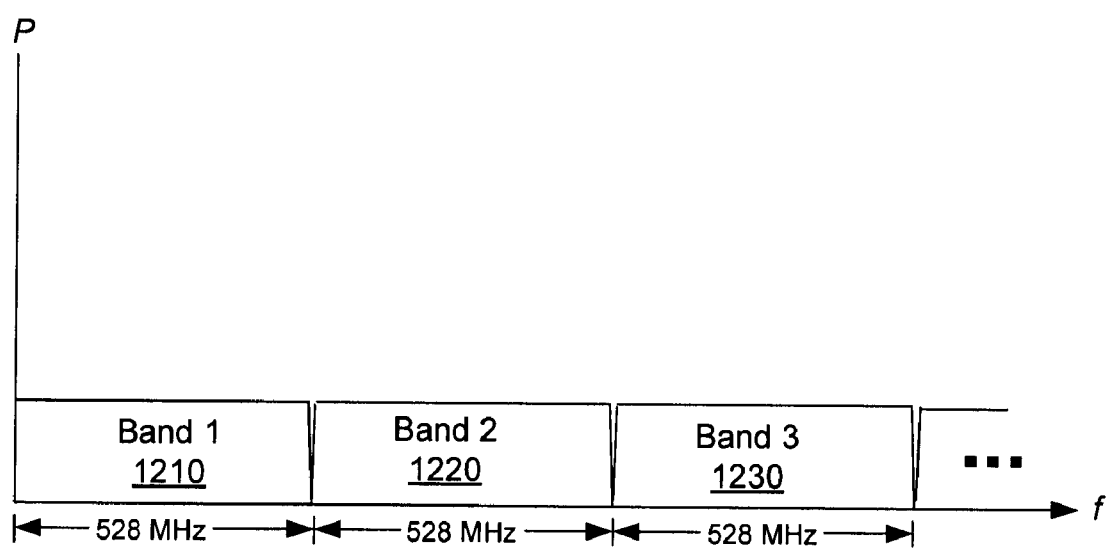
FIG. 12 depicts a diagrammatic representation of bands among which a UWB system may frequency hop in accordance with an embodiment.

The use of artificial silent periods using DRP slots reduces the throughput of the network and increases packet delivery latency. These disadvantages can be avoided by periodically performing band hopping. For devices that establish a superframe, hopping can be scheduled on a per-superframe basis. UWB devices are such devices, using a 64 ms superframe. For example, FIG. 12 depicts a diagrammatic representation of bands 1210-1230 among which a UWB system may frequency hop in accordance with an embodiment. In the illustrative example, the UWB system comprises 528 MHz bands 1210-1230, although numerous other bands may be included in the UWB system. In one implementation, a UWB system may periodically hop from one band 1210-1230 to another. Power averages and victim service detection routines may advantageously be performed by the UWB system on UWB bands while the UWB system is transmitting on other bands. For example, assume a UWB system has hopped from band 1210 to 1220. While the UWB system is operating in band 1220, power averages may be measured in band 1210 and 1230, and victim service detection mechanisms described hereinabove may be performed in bands 1210 and 1230. Accordingly, UWB devices deployed in the UWB system will not interfere with power average calculations and victim service detection in the evaluated bands since the UWB system is operating in band 1220. Subsequently, the UWB system may hop to band 1230, and power averages and victim service detection routines described herein may be performed in bands 1210 and 1220. Thus, the UWB system, by band hopping, may avoid interfering with power measurements and victim service detection. In addition, some victim services may claim that they need longer silent periods to make sure the victim receiver can hear the transmission from the victim base-station without any UWB transmission affecting its reception. One way to alleviate these problems is to use a non-hopping channel and change the channel every superframe. In this method, the frequency band usage schedule is signaled using information elements in beacons. By hopping every superframe, it is ensured that transmission is off a particular channel for at least 64 ms, thereby allowing victim receivers to hear their base-station during this period and without any loss in throughput since all slots can now be used.

In another embodiment, mechanisms and signaling may be provided which allow devices operating on different channels to coordinate their beacon periods for the purpose of coordinating transmit inactivity periods. This mechanism is useful when the channels being used have overlapping frequency bands. With this mechanism devices may periodically scan for beacons on channels other than the channel they are operating on and adjust their beacon transmit times so as to maintain alignment between beacon periods on different channels.

The flowcharts of FIGS. 6 and 8-10 depict process serialization to facilitate an understanding of disclosed embodiments and are not necessarily indicative of the serialization of the operations being performed. In various embodiments, the processing steps described in FIGS. 6 and 8-10 may be performed in varying order, and one or more depicted steps may be performed in parallel with other steps. Additionally, execution of some processing steps of FIGS. 6 and 8-10 may be excluded without departing from embodiments disclosed herein. The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like. Embodiments disclosed herein have been provided with reference to UWB systems. However, implementations of embodiments disclosed herein are not limited to any particular radio frequency system. Rather, embodiments disclosed herein may be implemented in any radio frequency system in which radio spectrum is shared by multiple systems and in which devices may utilize sub-carrier channels for effecting radio frequency transmissions.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

What is claimed is:

1. A method of detection and avoidance of victim service in an ultra-wideband system, comprising: receiving, by an apparatus, an orthogonal frequency division multiplexed (OFDM) signal; calculating, by the apparatus, a respective power average across a plurality of N tones in the OFDM signal
    performing, by the apparatus, a respective power measurement of each of the N tones
    comparing, by the apparatus, the respective power measurement of each of the N tones with the power average across the N tones; and
    determining, by the apparatus, whether any of the respective power measurements of each of the N tones exceeds the power average by a variable threshold.

2. The method of claim 1, further comprising identifying an interferer in response to determining a first power measurement of a first tone exceeds the power average by the threshold.

3. The method of claim 1, further comprising generating by a PHY layer of the ultra-wideband system an interrupt to notify an upper layer of the ultra-wideband system that an interferer has been identified.

4. The method of claim 1, further comprising varying the threshold value inversely with the gain level of an automatic gain controller.

5. The method of claim 1, further comprising configuring the ultra-wideband system with an indication of known spectrum of victim service bands.

6. The method of claim 5, further comprising identifying a victim service interferer in response to determining whether a power measurement of any tone exceeds the power average by the threshold.

7. The method of claim 6, further comprising responsive to identifying the victim service interferer, attenuating transmissions by the ultra-wideband system within the victim service band.

8. The method of claim 5, wherein the ultra-wideband system propagates knowledge comprising at least one of a location of the ultra-wideband system and a victim service band to a mobile ultra-wideband device.

9. The method of claim 1, further comprising:
    configuring the ultra-wideband system with indicia of at least one tone known to exhibit a spur in the ultra-wideband system; and
    excluding at least the one tone from the plurality of N tones for calculating the power average.

10. The method of claim 1, wherein a first tone of the N tones exhibits a spur, the method further comprising adjusting the variable threshold for the first tone by an amount substantially equal to the spur amplitude.

11. The method of claim 1, wherein the ultra-wideband system is configured with victim service band information based on geographic locations, the method further comprising:
    notifying, by a PHY layer of the ultra-wideband system, an upper layer of the ultra-wideband system that an interferer has been identified; and
    determining, by the MAC layer, whether the interferer is within the victim service band based on a geographic location of the ultra-wideband system.

12. The method of claim 1, wherein the ultra-wideband system is hosted by a device featuring a second radio system, and wherein the second radio system generates a victim service transmission, the method further comprising transmitting, by the ultra-wideband system, a notification to other ultra-wideband devices that the victim service transmission is being made.

13. The method of claim 12, wherein the notification is provided via a signaling message that indicates the second radio system is co-located with the ultra-wideband system thereby providing a reliability indication to the other ultra-wideband devices.

14. The method of claim 1, further comprising:
    identifying an interferer associated with a first band;
    determining, by an upper layer of the ultra-wideband system, a channel that is not included in the first band; and
    directing, by the upper layer, transmissions from the ultra-wideband system on the channel and excluding transmissions in the first band while the interferer is active in the first band.

15. The method of claim 1, further comprising:
    identifying an interferer comprising a victim service; and
    directing, by an upper layer of the ultra-wideband system, the ultra-wide band system to enter a mode selected from the group consisting of a low power mode and a sleep mode responsive to identifying the interferer comprises a victim service.

16. The method of claim 1, wherein performing the respective power measurements of the N tones is performed in a silent period of the ultra-wideband system.

17. The method of claim 16, wherein the silent period is coordinated by a ultra-wideband device that directs other devices in an ultra-wideband system to observe a specified silent period.

18. The method of claim 1, further comprising hopping among a plurality of bands available to the ultra-wideband system, wherein performing a respective power measurement of each of the N tones is performed in a band on which the ultra-wideband system is not currently transmitting data.

19. A non-transitory computer-readable medium having computer-executable instructions for execution by a processing system, the computer-executable instructions for detection and avoidance of victim services in an ultra-wideband system, comprising:
    instructions that calculate power average across a plurality of N tones in an orthogonal frequency division multiplexed (OFDM) signal;
    instructions that perform a respective power measurement of each of the N tones;
    instructions that compare the respective power measurement of the N tones with the power average; and
    instructions that determine whether any of the respective power measurements of each of the N tones exceed the power average by a variable threshold.

20. A system for detection and avoidance of victim services in an ultra-wideband system, comprising:
    an antenna adapted to receive orthogonal frequency division multiplexed (OFDM) signals;
    an analog-to-digital conversion (ADC) module configured to digitize the received OFDM signals;
    an automatic gain controller adapted to receive a digitized OFDM signal and apply a gain thereto;
    a Fast Fourier Transform module adapted to convert the digitized OFDM signal into a frequency domain; and
    a detect and avoid module adapted to receive a level of the gain applied by the automatic gain controller and to receive output of the fast Fourier Transform module, wherein the detect and avoid module adjusts a threshold in inverse relation to the gain level for detecting an interferer.

21. An apparatus for wireless communication, comprising:
a receiver configured to receive an orthogonal frequency division multiplexed (OFDM) signal; and
a detect and avoid (DAA) module configured to:
calculate power average across a plurality of N tones in the orthogonal frequency division multiplexed (OFDM) signal;
perform a respective power measurement of each of the N tones;
compare the respective power measurement of the N tones with the power average; and
determine whether any of the respective power measurements of each of the N tones exceed the power average by a variable threshold.

22. The apparatus of claim 21, wherein the DAA module is further configured to identify an interferer in response to determining a power measurement of any tone exceeds the power average by the threshold.

23. The apparatus of claim 21, wherein the DAA module is further configured to vary the threshold value inversely with a gain level of an automatic gain controller.

24. The apparatus of claim 21, wherein the DAA module is further configured to configure the ultra-wideband system with indicia of known spectrum of a victim service bands.

25. The apparatus of claim 24, wherein the DAA module is further configured to identify a victim service interferer in response to determining a power measurement of any tone exceeding the power average by the threshold.

26. The apparatus of claim 25, wherein the DAA module is further configured to attenuate transmissions by the ultra-wideband system within the victim service band responsive to identifying the victim service interferer.

27. The apparatus of claim 21, wherein the DAA module is further configured to:
configure the ultra-wideband system with indicia of at least one tone known to exhibit a spur in the ultra-wideband system; and
exclude the one tone from the plurality of N tones for calculating a respective power average.

28. An apparatus for wireless communication, comprising:
means for calculating a respective power average across a plurality of N tones in an orthogonal frequency division multiplexed (OFDM) signal;
means for performing a respective power measurement of each of the N tones;
means for comparing the respective power measurement of each of the N tones with the power average across the N tones; and
means for determining whether any of the respective power measurements of each of the N tones exceeds the power average by a variable threshold.

29. A wireless laptop, comprising:
an antenna;
a receiver configured to receive, via the antenna, an orthogonal frequency division multiplexed (OFDM) signal; and
a detect and avoid module configured to:
calculate a respective power average across a plurality of N tones in the orthogonal frequency division multiplexed (OFDM) signal;
perform a respective power measurement of each of the N tones
compare the respective power measurement of each of the N tones with the power average across the N tones; and
determine whether any of the respective power measurements of each of the N tones exceeds the power average by a variable threshold.

30. A method for wireless communication comprising:
receiving, by an apparatus, an orthogonal frequency division multiplexed (OFDM) signal;
digitizing, by the apparatus, the received OFDM signal;
applying, by the apparatus, a gain to the digitized OFDM signal;
generating, by the apparatus, a frequency domain representation of the digitized OFDM signal; and
adjusting, by the apparatus, a threshold in inverse relation to the gain level for detecting an interferer based, at least in part, on the gain and the frequency domain representation.

31. The method of claim 30, wherein detecting an interferer comprises:
calculating a power average across a plurality of N tones of the digitized OFDM signal;
performing a respective power measurement of the N tones; and
comparing the respective power measurement of the N tones with the power average.

32. The method of claim 31, wherein detecting the interferer further comprises determining whether any of the respective power measurements of the tones exceed the power average across tones by the threshold.

33. The method of claim 31, wherein detecting the interferer comprises identifying an interferer in response to determining a power measurement of any tone that exceeds the power average across tones by the threshold.

34. The method of claim 30, further comprising obtaining indicia of a known spectrum of a victim service band.

35. The method of claim 34, further comprising identifying a victim service interferer in response to determining a power measurement of any tone that exceeds the power average by the threshold.

36. An apparatus for wireless communication comprising:
means for receiving an orthogonal frequency division multiplexed (OFDM) signal;
means for digitizing the received OFDM signal;
means for applying a gain to the digitized OFDM signal;
means for generating a frequency domain representation of the digitized OFDM signal; and
means for adjusting a threshold in inverse relation to the gain level for detecting an interferer based, at least in part, on the gain and the frequency domain representation.

37. A non-transitory computer-readable medium having computer-executable instructions for execution by a processing system, the computer-executable instructions for wireless communication, comprising:
instructions that receive an orthogonal frequency division multiplexed (OFDM) signal;
instructions that digitize the received OFDM signal;
instructions that apply a gain to the digitized OFDM signal;
instructions that generate a frequency domain representation of the digitized OFDM signal; and
instructions that adjust a threshold in inverse relation to on the gain level for detecting an interferer based, at least in part, the gain and the frequency domain representation.

38. An apparatus for wireless communication:
an analog-to-digital conversion (ADC) module configured to digitize an OFDM signal;

an automatic gain controller adapted to receive the digitized OFDM signal and apply a gain thereto;

a Fast Fourier Transform module adapted to convert the digitized OFDM signal into a frequency domain; and a detect and avoid module adapted to receive a level of the gain applied by the automatic gain controller and to receive output of the fast Fourier Transform module, wherein the detect and avoid module adjusts a threshold in inverse relation to the gain level for detecting an interferer.

39. The apparatus of claim 38, wherein the detect and avoid module calculates a power average across a plurality of N tones of the OFDM signal, performs a respective power measurement of the N tones, and compares the respective power measurement of the N tones with the power average.

40. The apparatus of claim 39, wherein the detect and avoid module determines whether any of the respective power measurements of the tones exceed the power average across tones by the threshold.

41. The apparatus of claim 38, wherein the detect and avoid module identifies an interferer in response to determining a power measurement of any tone that exceeds the power average across tones by the threshold.

42. The apparatus of claim 38, wherein the detect and avoid module is configured with indicia of a known spectrum of a victim service band.

43. The apparatus of claim 42, wherein the detect and avoid module identifies a victim service interferer in response to determining a power measurement of any tone that exceeds the power average by the threshold.

* * * * *